Nov. 3, 1936.  W. NANFELDT  2,059,387

MOLDED BRAKE LINING APPARATUS

Filed Nov. 26, 1930  4 Sheets—Sheet 1

INVENTOR
WILLIAM NANFELDT
BY
ATTORNEY

Nov. 3, 1936.  W. NANFELDT  2,059,387
MOLDED BRAKE LINING APPARATUS
Filed Nov. 26, 1930  4 Sheets-Sheet 3

INVENTOR
WILLIAM NANFELDT
BY
ATTORNEY

Nov. 3, 1936.  W. NANFELDT  2,059,387

MOLDED BRAKE LINING APPARATUS

Filed Nov. 26, 1930  4 Sheets-Sheet 4

INVENTOR
WILLIAM NANFELDT
BY
Chester W Crasellas
ATTORNEY

UNITED STATES PATENT OFFICE 2,059,387

MOLDED BRAKE LINING APPARATUS

William Nanfeldt, Clifton, N. J., assignor to World Bestos Corporation, Paterson, N. J., a corporation of Delaware Application November 26, 1930, Serial No. 498,287

8 Claims. (Cl. 18—17)

This invention relates to the treatment of molded brake linings, and more particularly to means for shaping and curing segments of molded brake lining.

Heretofore, in bringing segments of brake lining to the proper internal curvature and curing the brake lining, it has been substantially impossible to avoid causing variations in thickness which are greater than the allowed tolerance. Another difficulty has been in obtaining substantial uniformity of curing.

Among the objects of the present invention is the provision of means whereby such disadvantages are avoided. Another object is to provide improved means for curing brake linings. A further object is to provide means whereby the shaping and curing of a considerable number of brake lining segments can be carried out at one time.

A further object is to provide apparatus whereby the material to be treated can readily be inserted and removed. Another object is to provide apparatus of the character described whereby manual operations are reduced to a great extent. This invention also contemplates the provision of means for imparting the desired curvature to molded brake linings without any substantial change in the original thickness.

Further objects relate to the provision of apparatus which can readily be changed to produce brake linings of different radii of curvature; apparatus which avoids loss of heat as compared for example, with apparatus heretofore in use in which steam is discharged at the termination of the curing operation; apparatus which is easy to handle in that, for example, there is no requirement for manual shifting of heavy molds or mandrels; apparatus in which the molds and mandrels are shifted by the apparatus in its operation and the brake linings are inserted and removed by means of relatively light trays which may be of considerable capacity.

Other objects and advantages will appear upon consideration of the following description and of the drawings, in which.

Figure 1:
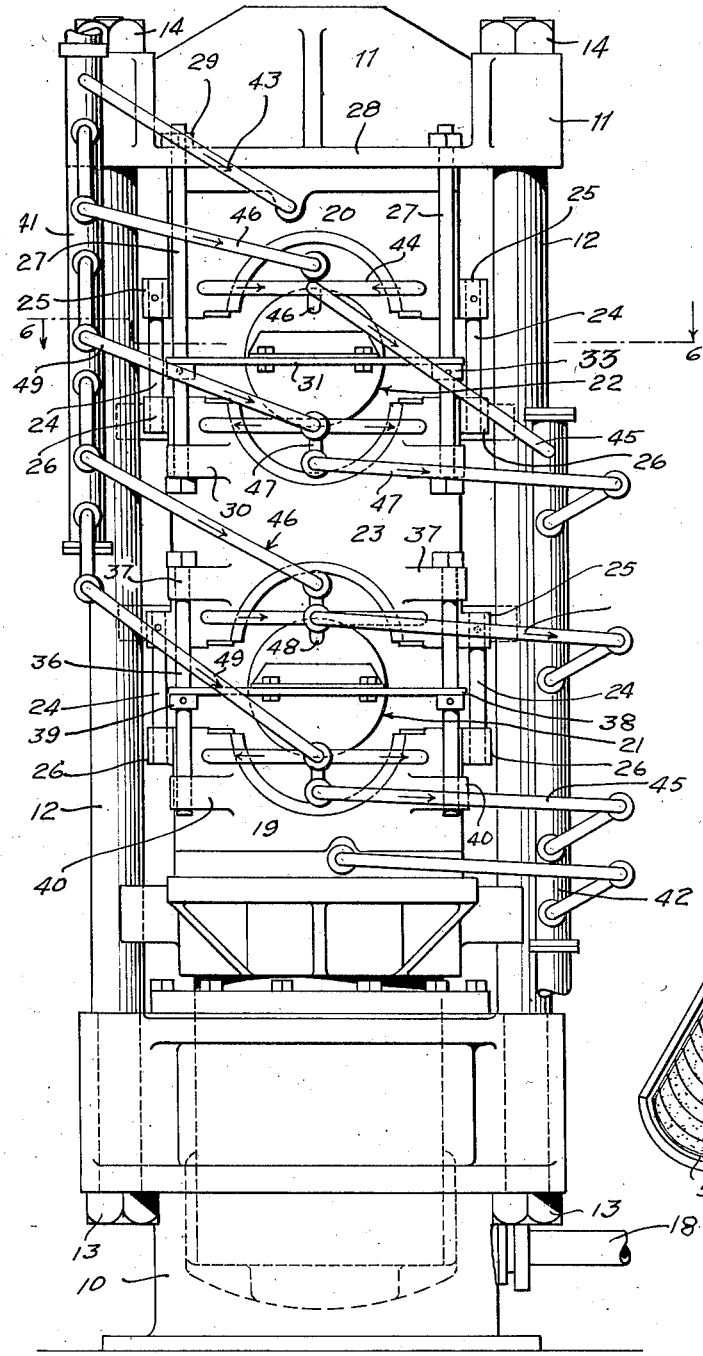
Fig. 1 is an end elevation of apparatus embodying the present invention.
Figure 2:
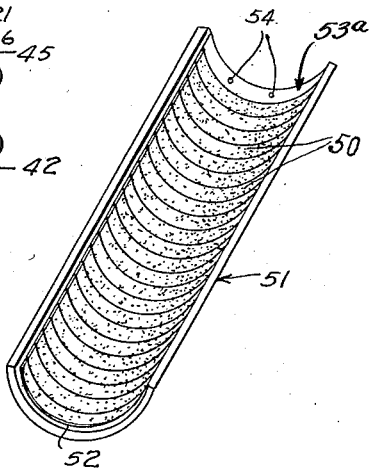
Fig. 2 is a perspective view of a tray for use in inserting and removing the brake lining.

According to the preferred form of the invention, use is made of molds having faces of semicircular cross-section and which are maintained in proper alignment with each other, and also a floating mandrel between the opposed molds. The molds and mandrel are maintained at substantially the same temperature which is high enough to cure the brake lining pressed therebetween. When the molds are in separated relation with reference to the mandrel, brake lining material, preferably in the form of a set of strips, is placed between each mold, and the mandrel and the molds are then moved towards each other to press the brake lining between them and the mandrel which, due to its floating mounting, adjusts itself as required. Preferably use is made of a plurality of mandrels and sets of molds so arranged that the closing of the molds over the mandrels is effected by a single operating means.

The apparatus illustrated is in the general form of a press having a base 10 and a head 11 connected by vertical rods or standards 12, each of which has a reduced lower end passing downwardly through a bore in a projecting portion of the base, and a reduced upper end extending through a corresponding bore in a projecting part of the head 11. As here shown, the rods or standards 12 are arranged in pairs at opposite sides of the press and are supported by engagement of the shoulders at the upper ends of the reduced lower ends of the rods with the upper surfaces of the projections of the base, and the head 11 is supported by engagement thereof with corresponding shoulders at the upper ends of the standards. The frame just described is held together by suitable means such as nuts 13, screwed on the reduced lower ends of the standards 12 and nuts 14 screwed on the reduced upper ends thereof. The base 10 also constitutes a power cylinder in which is mounted a plunger 15 having a head 16 which is guided and held against turning by projections 17 cooperating with the standards 12. Movement of the plunger 15 is effected by the admission of fluid under pressure, compressed air, for example, through the pipe 18.

Mounted on the plunger head 16 is an upwardly facing mold 19 having a face substantially semi-circular in cross section, and mounted at the lower side of the head 11 is a downwardly facing mold 20 of the same general form as the mold 19. As here shown, there are two cylindrical molds or mandrels, one mandrel 21 to cooperate with the lower mold 19 and a second mandrel 22 to cooperate with the upper mold 20. Instead of having two separate molds one to engage the upper side of the mandrel 21 and the other to engage the lower side of the mandrel 22, there is provided an intermediate mold 23 shaped at its lower side to cooperate with the mandrel 21 and at its upper side to cooperate with the mandrel 22. It should be understood that use may be made of a larger number of mandrels with corresponding intermediate molds 23.

To maintain the mold 19 and the mold 23 in alignment, use may be made of rods or pins 24 secured in any suitable manner in ears 25 projecting from the mold 23 near its lower edge, and of ears 26 projecting from the mold 19 near its upper edge and having openings therethrough in which the rods or guides 24 slide. It will be seen that the rods 24 have the general effect of dowels in maintaining the molds 19 and 23 in proper relation with respect to each other. The mold 20 and the mold 23 are maintained in alignment in a similar manner.

Figure 3:
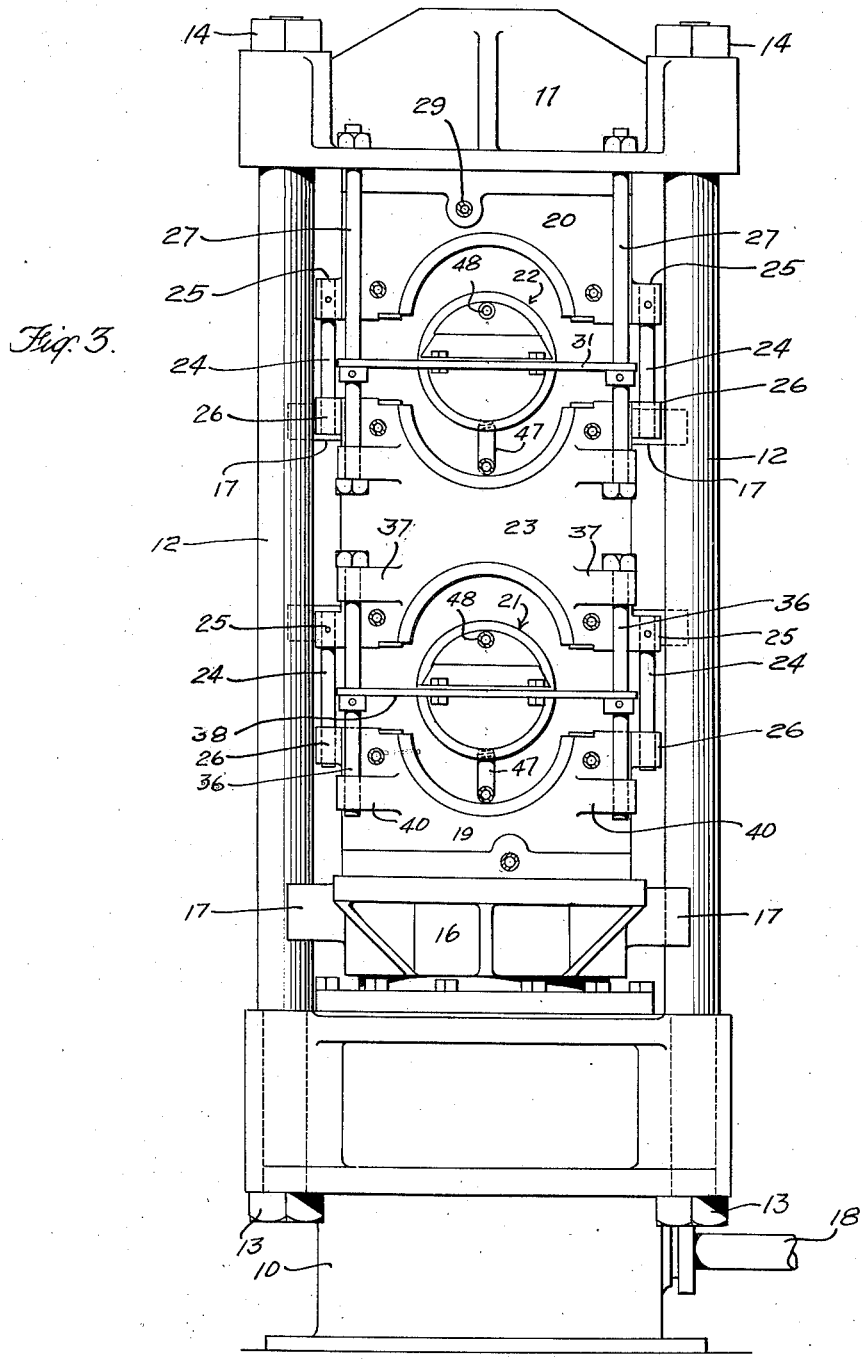
Fig. 3 is a view similar to Fig. 1 with the steam supply connections omitted.
Figures 4, 5:
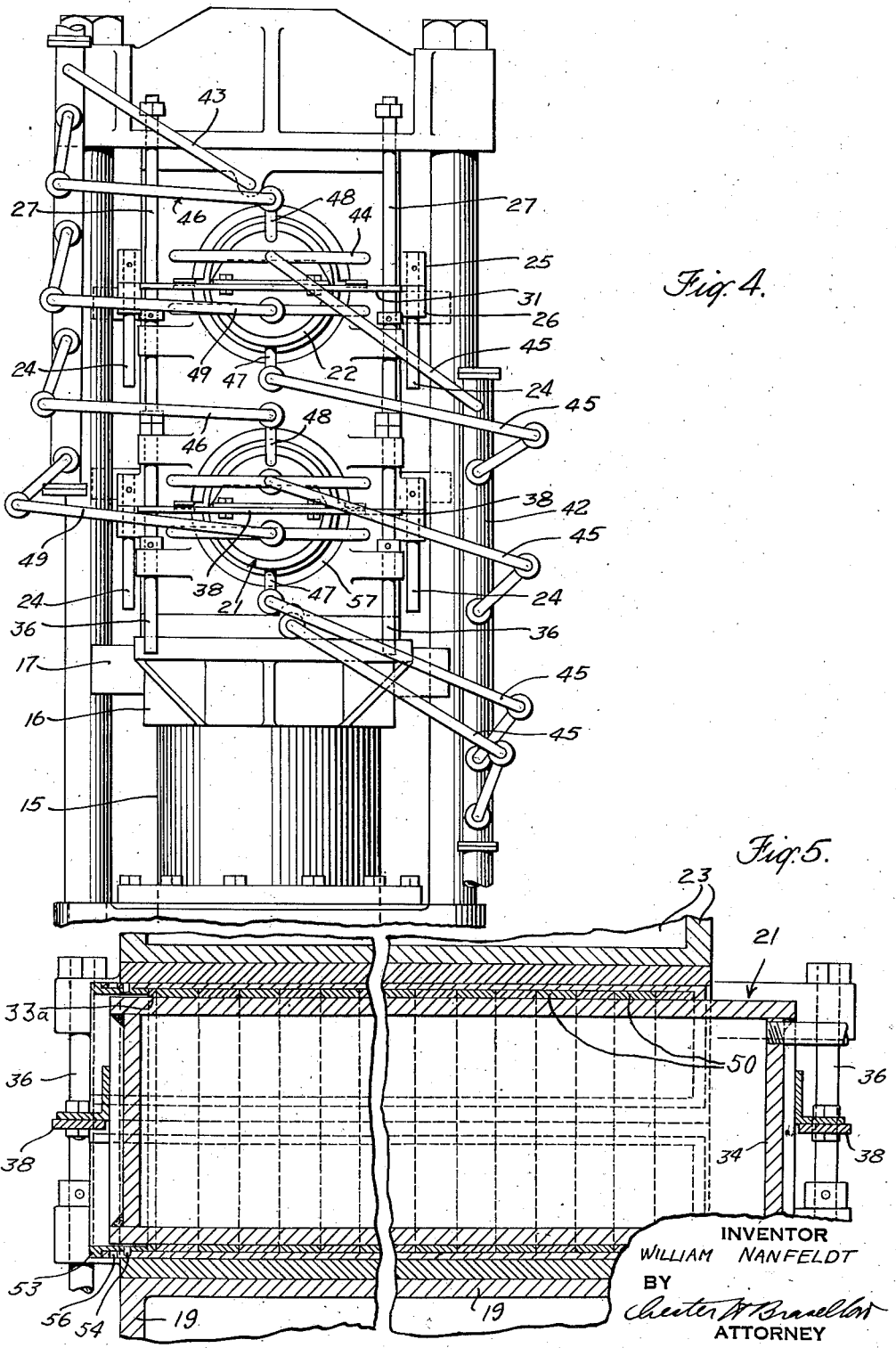
Fig. 4 is a view similar to Fig. 1 with the press closed.
Fig. 5 is a fragmentary view in vertical section through the axis of one of the mandrels.

When the press is closed, as indicated in Fig. 4, the lower mold 19, the intermediate mold 23, and the two mandrels 21 and 22 are supported by the plunger 15, but obviously provision must be made for limiting the downward movement of certain of these parts when the plunger moves downwardly to open the press. As shown most clearly in Figs. 1 and 3, the upper mandrel 22 and the intermediate mold 23 are controlled as to their lowermost positions by means including bolts 27 extending through openings in flanges 28 at opposite ends of the head 11 and limited as to downward movement by suitable means such as nuts 29 screwed on the upper ends thereof. These bolts also extend through lugs 30 projecting from the intermediate mold 23 at the upper part thereof, and the downward movement of the intermediate mold is limited by engagement of these lugs 30 with the heads of the bolts 27.

Figure 6:
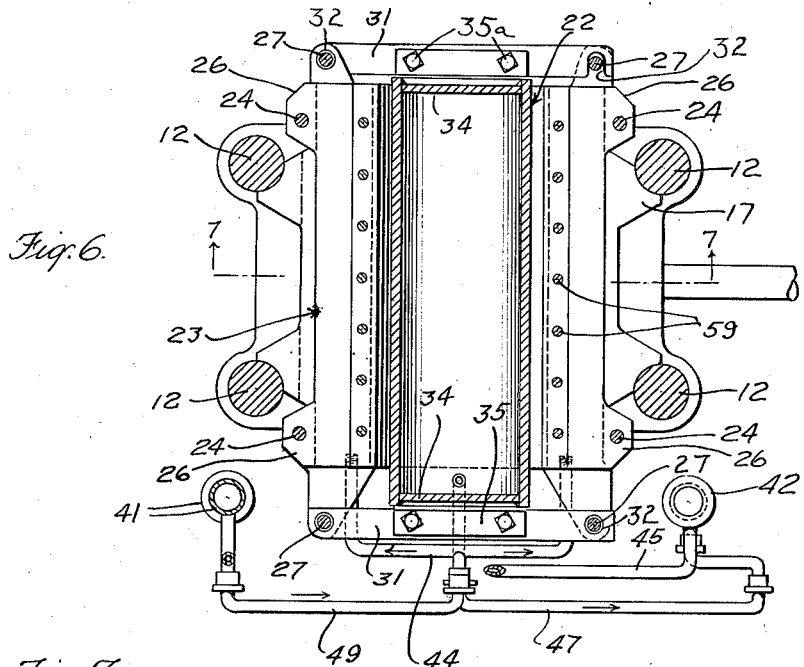
Fig. 6 is a section taken along the line 6—6 of Fig. 1.

The mandrel 22 is limited as to downward movement by means of horizontal bars 31 secured to the mandrel at opposite ends thereof and having in their ends eyes or openings 32 to receive loosely the rods or bolts 27. When the mandrel 22 is in its lowermost position, the ends of the horizontal bars 31 rest on collars 33 secured to the bolts 27. As shown in Fig. 6, the mandrel 22 is made up of a cylindrical shell and heads 34 fitting into the interior thereof and secured in position in any suitable manner, as by welding or brazing. The horizontal bars 31 may be secured to the mandrel 22 by means of pieces 35 of angle material of angular cross-section of which the horizontal flanges are secured to the bars 31 by suitable means, such as bolts 35a, and the vertical flanges are secured to the mandrel 22 as by welding.

As indicated at the top of Fig. 6, one opening 32 in the bar 31 extends to the inner edge thereof so that when the bolts 35a at both ends of the mandrel are removed and the bar 31, just referred to, is swung outwardly, the mandrel may be withdrawn. Removal of the mandrel at the opposite end is impracticable due to steam connections which will be described hereinafter.

Inasmuch as the mold 19 is mounted on the plunger head 16 there is no necessity for connecting it with mold 23 to limit its downward movement. It is, however, necessary to limit the downward movement of the lower mandrel 21.

To this end provision is made of bolts 36 passing downwardly through openings in lugs 37 projecting from the lower end of the intermediate mold 23. When the press is in open position, the bolts 36 are held against downward movement by engagement of their heads with the upper surfaces of the lugs 37. The lower mandrel 21 is similar in construction to the upper mandrel 22 and when in its lowermost position is similarly supported by horizontal bars 38 resting on collars 39 fixed on the bolts 36. The bolts 36 are of sufficient length to project at all times into openings in lugs 40 projecting from the lower mold 19. As here shown, the bolts 36 are in alignment with the bolts 37.

In order to obtain proper curing of the brake lining, the heating of the molds 19, 20 and 23 and of the mandrels 21 and 22 should be as uniform as possible. To obtain such uniform heating, steam is supplied to the parts just mentioned from a steam chamber or header 41, and after producing its heating effect is discharged into an exhaust steam chamber or header 42. It should be understood that all of these steam connections are at one end of the press in order to leave the other end of the press free so as to avoid interference with the insertion and removal of the brake lining. As here shown, steam is supplied to the upper part of the stationary hollow mold 20 through a stream connection 43 and is withdrawn from the lower ends of the branches of the mold by pipes 44 extending from opposite sides thereof and connecting at the middle of the end of the press with an exhaust line 45 connected with the exhaust header 42.

The mandrel 22 is supplied at its upper end with steam through a steam hinge connection 46 and steam is withdrawn from the lower end thereof through a steam hinge connection 47 to the exhaust header 42 as seen clearly in Fig. 4. The steam hinge connection 46 terminates with a pipe section 48 fixed with respect to the mandrel 22 and projecting upwardly therefrom so as to permit this part to move down at the inside of the pipes 44 to the position indicated in Fig. 1, and the steam hinge connection 47 includes a part similar to pipe section 48 but projecting downwardly from the mandrel 22. Steam is supplied to the upper end of the intermediate mold 23 by steam hinge connection 49 which terminates in a fork connected with the mold 23 at opposite sides of the upper recess, steam being discharged from said mold 23 by means similar to that for discharging steam from the upper mold 20 except that the connection must be through a steam hinge due to the fact that the intermediate mold 23 moves up and down. The other connections for steam supply and steam exhaust are similar to those already described, and it is thought unnecessary to describe them in detail inasmuch as steam hinge connections are in general use.

Figure 7:
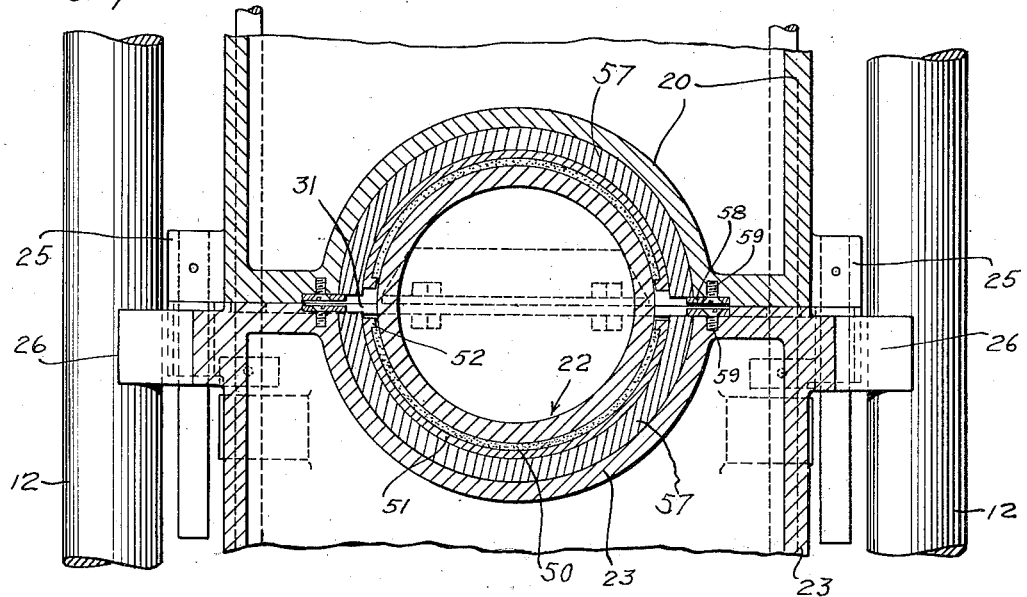
Fig. 7 is a section taken on the line 7—7 of Fig. 6.

The molded brake lining may be in the form of strips 50 which are assembled side by side in one or more trays or holders 51 such as shown in Fig. 3 and Fig. 7. At each side and at one end, each tray 51 is provided with a flange 52 which, while high enough to hold the strips 50 in position, does not rise to the level of the surface of the brake lining, and, therefore, does not interfere with the exertion on the brake lining of pressure due to the movement of the molds towards the mandrel. After brake lining strips 50 have been assembled in a tray 51, they may be held in position by means of an arcuate member or retainer 53, slightly less than a semi-circumference in length, placed in the open end of the tray 51 and held in such position by means of one or more pins 54 projecting outwardly therefrom into corresponding recesses 55 in the tray. Preferably provision is made for about one-thirty-second of an inch play between the brake lining and the retainer 53, and if there is a greater space a narrow filler strip 53a may be inserted at the inside edge of the retainer. The member 53 may also be provided at its outer edge with an outwardly extending flange which engages the outer edge of the tray 51. The tray 51 is also provided at its open end with suitable means, such as holes 56 for engagement with suitable implements used in inserting and removing the tray.

As shown in Fig. 7, the trays 51 do not engage directly with the cylindrical parts of the molds but rest against removable liners 57 normally held in position by strips 58 secured in suitable recesses in the molds and projecting beyond the edges of the liners to hold them in position. These strips may be held in position in any suitable manner as by means of screws 59. It will be evident that by use of liners 57 of suitable thickness, the molds can be made to cooperate with mandrels of different radii in accordance with the desired curvature of the brake linings to be treated. Obviously trays 51 must correspond with the curvature of the mandrels and inner surfaces of the liners.

The operation of the apparatus is substantially as follows:

Starting with the press open as indicated in Fig. 1, four trays 51 are filled with brake lining strips 50 and inserted one above and one below each of the mandrels 21 and 22. Compressed fluid is then admitted through the pipe 18 to the cylinder in the base 10, and the plunger rises picking up in order the mandrel 21, the intermediate mold 23 and the upper mandrel 22 until the parts assume the position indicated in Fig. 4, the pressure being sufficient to assure suitable contact of the brake band strips with the metal at opposite sides thereof and consequently uniform heating of the brake lining. When the heating has been continued for a sufficient period, the plunger is released and the parts are restored to the positions indicated in Fig. 1. The trays of cured brake lining are then removed and trays filled with fresh brake lining material are inserted. This operation may be repeated indefinitely.

It should be understood that the strips of brake lining 50, which are to be treated in the apparatus of the present invention, are brought to the proper size with a high degree of accuracy. These strips 50 may be of rubber composition containing heat resisting material, such as asbestos, and partly cured before the final shaping and curing in the present apparatus. Ordinarily the pressure exerted by the press does not compress any of the strips of brake lining more than one one-thousandth of an inch (1/1000″) and serves the purpose of effecting suitable contact for heat transmission from the heated molds and mandrels to the brake lining. By methods and apparatus heretofore in use it has been substantially impossible to obtain cured segments of brake lining sufficiently uniform in thickness to do more than meet tolerance requirements of about two one-hundredths of an inch (2/100″) whereas by use of the present apparatus the tolerance can be kept down to an amount between one one-thousandth and two one-thousandths of an inch.

The apparatus of the present invention has many advantages over apparatus heretofore in use. The brake linings are given the desired curvature without imparting any substantial variation in their thickness or in the uniformity of thickness throughout their length and breadth. The opening and closing of the shaping members is effected by power and the shaping members are brought accurately into closed position without attention by the operator. There is no manual shifting of molds and mandrels during the normal operation of the machine. A considerable number of brake linings are easily inserted and removed at one time by means of relatively light trays curved to conform with the mandrels and liners in use in the machine.

The mandrels can readily be disconnected from their supports and from the steam connection and removed from the machine. The liners may also be so removed, and other mandrels and liners inserted. Due to the internal heating of the mandrels and molds, the opening of the press causes no loss of steam such as occurs before the brake linings are removed from chambers in which the curing is effected by steam after the brake linings have been secured in forming devices and inserted therein. As a result of maintaining the forming parts at substantially the same temperature, there is substantially no change in the shape of the parts, such as might occur if the temperature were varied and the heating was not effected uniformly.

Various changes may be made and some features may be used without others, without departing from the true scope and spirit of the invention.

Having thus described my invention, what I claim is:

1. In apparatus of the class described, the combination of a convex shaping member having at one side substantially half of a circular cylindrical surface to act on the strip material at one side, a second shaping member having a recess with a corresponding circular cylindrical surface to act on the strip material at the other side, means for holding the strip material in direct contact with one of said cylindrical surfaces, means for guiding said members substantially in a straight line in their movement toward and from each other while permitting limited relative adjustment thereof, single means for applying pressure to said members, and means for effecting uniform heating of said shaping members.

2. In apparatus of the class described, the combination of a convex shaping member having at one side substantially half of a circular cylindrical surface to act on the strip material at one side, a second shaping member having a recess with a corresponding circular cylindrical surface to act on the strip material at the other side, means for holding the strip material in direct contact with one of said cylindrical surfaces, means for guiding said members substantially in a straight line in their movement toward and from each other, the guiding means for said convex member including a rod movable in an opening having a greater diameter than the rod whereby relative adjustment between the convex member and rod is made possible, single means for applying pressure to said members, and heating means for maintaining said forming members at the required temperature.

3. In apparatus of the class described, the combination of a convex shaping member having at one side a circular cylindrical surface to act on one side of the material, a second shaping member having a recess with a corresponding circular cylindrical recess and a liner for said recess to cooperate with the first mentioned shaping member in shaping the material so that by use of liners of suitable thickness the second shaping member may be used with convex shaping members having cylindrical surfaces of different radii, and a tray to hold said material against the surface of the convex shaping member and shaped to fit against the surface of the liner.

4. The combination, in molds for curing brake linings, of a die element having a concave recess, a plunger element of convex contour complemental to said die element, means for moving said mold members into and out of matching relation with respect to brake lining material positioned therein, guides for maintaining said die and plunger elements in alignment when movement is imparted thereto, and a detachable shell having the same contour as the inner surface of the mold for positioning the brake lining sections in the die element; said shell being adapted to remain in position while the article is being molded.

5. The combination in molding mechanism for curing brake lining of a concave mold, a convex mold complemental to said concave mold, means for moving said molds into and out of coacting relationship with respect to brake lining material positioned thereinbetween, guides for maintaining said molds in alignment when movement is imparted thereto, and a detachable shell having the same contour as the inner surface of the mold for positioning the brake lining sections in the mold, said shell being adapted to remain in position while the article is being molded.

6. In apparatus of the class described the combination of a plurality of substantially horizontal convex molds arranged in a vertical plane, concave molds arranged alternately with reference to said convex molds, the top mold being stationary and the other molds movable, means for guiding said movable molds including a rod and eye connection to the convex mold with the eye diameter over-large with reference to the rod diameter, means for limiting the downward movement of the molds to effect separation therebetween, and trays for holding the brake lining in position between each convex mold and the adjacent concave mold, each of said trays holding the brake lining directly in contact with one of said convex molds and facilitating removal of the brake lining after treatment.

7. In apparatus of the class described the combination of a plurality of substantially horizontal convex molds arranged in a vertical plane, concave molds arranged alternately with reference to said convex molds, the top mold being stationary and the other molds movable, means for limiting the downward movement of the molds to effect separation therebetween, trays for holding the brake lining in position between each convex mold and the adjacent concave mold, each of said trays holding the brake lining directly in contact with one of said convex molds and facilitating removal of the brake lining after treatment, and power means for raising the bottom mold and thereby causing movement of each of the movable molds into operative relationship with its cooperative mold.

8. In apparatus of the class described the combination of a hollow convex mold, a concave mold at one side of said convex mold, a concave mold at the other side of said convex mold, means for effecting relative movement between said molds to bring the molds into cooperative relationship, means for controlling the position of said convex mold between said concave molds, trays adapted to hold brake lining positioned between said convex mold, the holding recesses of said trays being adjacent the convex mold surface, and means for supplying heat to the interior of said convex mold whereby heat may be directly applied to the brake lining.

WILLIAM NANFELDT.